United States Patent
Garraffa et al.

[11] Patent Number: 5,303,587
[45] Date of Patent: * Apr. 19, 1994

[54] DIVER'S DEPTH GAUGE

[75] Inventors: Dean R. Garraffa; James T. Dexter, both of Huntington Beach, Calif.

[73] Assignee: Under Sea Industries, Inc., Rancho Dominguez, Calif.

[*] Notice: The portion of the term of this patent subsequent to Jun. 19, 2007 has been disclaimed.

[21] Appl. No.: 324,815

[22] Filed: Mar. 17, 1989

[51] Int. Cl.$^5$ .................. G01L 7/04; G01D 13/24
[52] U.S. Cl. ........................ 73/300; 73/739; 116/291; 116/296
[58] Field of Search .......... 73/300, 709, 739; 116/296, 291

[56] References Cited

U.S. PATENT DOCUMENTS

| | | | |
|---|---|---|---|
| 523,404 | 7/1894 | Meady | 73/739 |
| 1,290,375 | 1/1919 | Shaw | 73/739 |
| 2,125,016 | 7/1938 | Gruver | 73/739 |
| 4,196,623 | 4/1980 | Alinari | 73/300 |
| 4,196,690 | 4/1980 | Alinari | 73/300 X |
| 4,352,168 | 9/1982 | Anderson | 73/300 X |

Primary Examiner—Daniel M. Yasich
Attorney, Agent, or Firm—Leonard Tachner

[57] ABSTRACT

The present invention comprises an oil-filled depth gauge which is made far less sensitive to violent shock and the potential resulting inaccuracies to the maximum depth gauge indicator from such shock. More specifically, the present invention comprises an improved oil-filled scuba diving depth gauge in which the improvement provides a fluid dam member which may be affixed to or molded into the transparent enclosure covering the dial face to effectively block the flow of the oil in the region of the gauge occupied by the maximum depth indicator dial. The fluid dam reduces the likelihood that a sudden jar or other violent shock will induce a relative differential in the motion between the oil and the gauge body which might otherwise produce inaccuracies in the position of the maximum depth indicator dial.

1 Claim, 1 Drawing Sheet

DIVER'S DEPTH GAUGE

BACKGROUND OF THE INVENTION

1. Field of the Invention

The present invention relates generally to depth gauges for scuba divers and more specifically to an improved oil-filled depth gauge of the type having a maximum depth indicator, the improvement residing in a modification for reducing the likelihood of an inaccuracy in the maximum depth indicator reading.

2. Prior Art

One of the most important instruments carried by a scuba diver is his depth gauge, which indicates how far he is below the surface of the water. Knowledge of the depth adds to the enjoyment of the dive as well as supplying depth information which dictates precautions and procedures for safe and efficient diving during both the normal and the extreme. The human body has no reliable means of discriminating depth accurately even though it is quite sensitive to this change in depth and water pressure. There are many factors that should be considered when selecting the depth gauge, but probably the most important is accuracy. The accuracy of the depth gauge depends upon the following three elements: Repeatability of the gauge movement; Accuracy of the transmission of the surrounding pressure to the gauge mechanism; and accuracy of the calibration. Repeatability can be defined as the ability of the depth gauge mechanism to consistently produce the same readings. Such overall consistency depends upon the sensitivity of the pressure sensing device and the accuracy of the gear drive mechanism. Superior depth gauge devices use oil-filled capsule depth gauges having a Bourdon spring tube coupled to an indicator needle with a rack and pinion gear drive. The accuracy of the depth gauge is affected by the internal friction or hysteresis of the mechanism. Hysteresis can be minimized by providing an oil suspension specifically formulated to have the least amount of friction and the lowest viscosity change through the normal temperature range encountered in diving. In addition, the ambient pressure transfer diaphragm must be made from a material which maintains the accuracy of the finished gauge to within a small tolerance of the original mechanism in water temperatures ranging from about 32 degrees Fahrenheit to 90 degrees Fahrenheit. Normal calibration accuracies for Bourdon tubes in standard depth gauges is plus or minus 2% of the full scale, regardless of location of the needle on the dial face. In order for manufacturers to be sure that the mechanism stays within this accuracy, they calibrate the gauge to read most accurately at the midpoint of the dial. Thus, a two hundred foot gauge, for example, can vary by plus or minus four feet anywhere on the dial. At twenty feet, the gauge could read sixteen to twenty four feet and still be acceptable by the plus or minus 2% standard. A critical parameter readout provided by such depth gauges is the maximum depth to which a diver has a descended during his dive. This parameter is of critical importance because it determines how much time the diver must reserve for ascending to the surface without running the risk of nitrogen sickness or requiring decompression to overcome such an affliction. Typically, the maximum depth indicator is a simple mechanical dial needle which is pushed by the instantaneous depth gauge dial needle but which can be manually returned to zero at the end of the dive. Accordingly, the maximum depth gauge dial reads the greatest depth to which the diver has descended during his dive.

One of the most precise scuba diving depth gauges is filled with oil, which makes it more sensitive to pressure variations and less sensitive to temperature variations.

Unfortunately, there is a potential disadvantage associated with oil-filled depth gauges, particularly in regard to the potential influence of the oil on the maximum depth readout. This disadvantage is likely to occur whenever the gauge is inadvertently jarred, such as when a wrist worn gauge is inadvertently bumped against a rock or other surface. Such jarring may result in a sudden relative acceleration difference between the body of the gauge, and the oil contained therein. When this occurs, it is likely that this relative difference in acceleration between the oil and the body of the gauge will cause motion of the maximum depth gauge indicator and obviously such motion destroys the accuracy of the maximum depth reading. Inaccuracy in the maximum depth gauge reading, can as a minimum be a great inconvenience and even potentially hazardous. If the depth gauge reading is moved to (erroneously indicate) a greater maximum depth, it may cause the diver to abort his dive earlier than necessary in order to rise to the surface at an earlier time. On the other hand, if the movement of the maximum depth gauge reading reduces the reading which results in an erroneous shallower maximum depth indication, which results in a false shallower depth reading, the diver may stay below the surface longer than he should to avoid the requirements of decompression and thus incur severe physical injury. Accordingly, there has been a long felt need for an accurate scuba diving depth gauge which is less likely to be affected by violent shock so that the maximum depth gauge indication is more accurate, irrespective of such violent shock.

SUMMARY OF THE INVENTION

The present invention solves the aforementioned long felt need by providing an oil-filled depth gauge which is made far less sensitive to violent shock and the potential resulting inaccuracies to the maximum depth gauge indicator from such shock. More specifically, the present invention is an improved oil-filled scuba diving depth gauge in which the improvement comprises a fluid dam member which is molded into or otherwise permanently installed on the transparent enclosure covering the dial face and extends to the dial face to effectively block the flow of the oil in the region of the gauge occupied by the maximum depth indicator dial. The fluid dam reduces the likelihood that a sudden jar or other violent shock will induce a relative differential in the motion between the oil and the gauge body which might otherwise produce the previously noted inaccuracies in the position of the maximum depth indicator dial.

OBJECTS OF THE INVENTION

It is therefore a principal object of the present invention to provide an oil-filled scuba diving depth gauge comprising a unique improvement which entirely overcomes or substantially reduces the noted deficiencies of the prior art.

It is an additional object of the present invention to provide a high precision oil-filled scuba diving depth gauge having an improvement comprising a fluid dam member or barrier positioned between the dial face and the transparent gauge cover for resisting the flow of oil around the region of the gauge immediately in front of the dial face upon inadvertent jarring or other violent shock which may be imparted to the gauge during the dive.

It is still an additional object of the present invention to provide an improved oil-filled depth gauge for scuba divers, the improvement comprising a barrier located on the face of the depth gauge for preventing or reducing the flow of oil along the face of the depth gauge which might otherwise be incurred during jarring or violent shock inadvertently imparted to the gauge body and which would otherwise create a differential motion between the depth gauge body and the oil contained therein and cause inaccuracies in the position of the maximum depth gauge indicator.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment, when taken in conjunction with the following drawings in which.

DETAILED DESCRIPTION OF A PREFERRED EMBODIMENT

Figure 1:
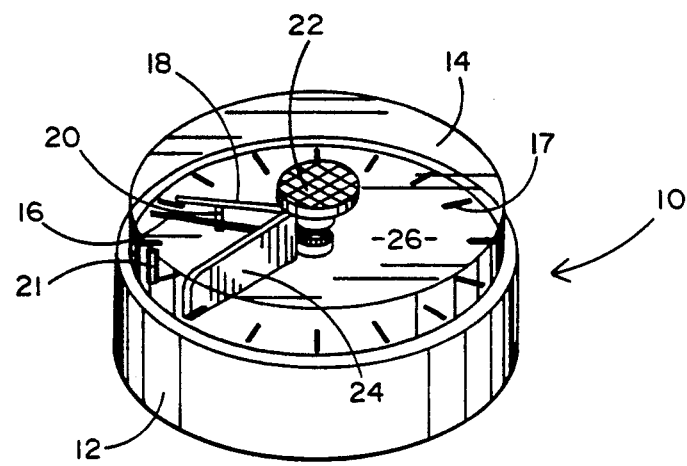
FIG. 1 is an isometric view of the present invention.

Referring now to the accompanying figures, it will be seen that a depth gauge 10 of the present invention comprises a housing 12, preferably made of a flexible material such as a rubber-like compound to provide a flexible, pressure transmitting diaphragm. The housing is enclosed on one side by a transparent enclosure 14. Enclosed within the housing 12 and transparent enclosure 14 is a Bourdon spring tube (not shown) coupled to an indicator needle 16 with a rack and pinion gear drive (not shown). A dial face 26 is positioned beneath the indicator needle 16 and is provided with a plurality of graduations 17. The housing 12 and transparent enclosure 14, in combination, provide a liquid-tight chamber which is filled with a low friction and low viscosity fluid such as silicone suspension oil. The oil permits transfer of ambient pressure through the rear Wall of the housing 12 and the fluid to the bourdon spring tube within the gauge. As a result, increasing ambient pressure resulting from greater depths produces clockwise rotation of the indicator needle 16 which when calibrated against the graduations 17, provides an accurate instantaneous reading of the actual depth to which the diver has descended.

Figure 2:
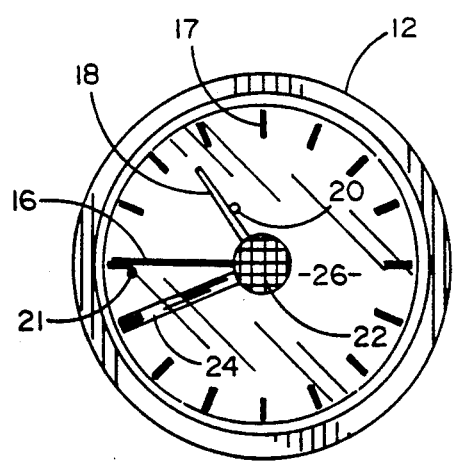
FIG. 2 is a front-view of the invention.
Figure 3:
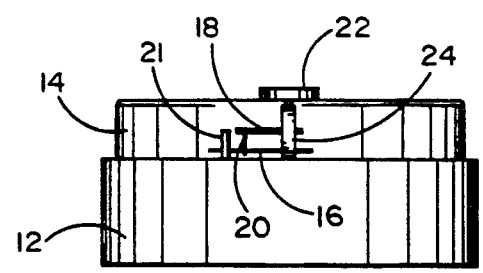
FIG. 3 is a side-view of the invention.

The oil-filled depth gauge 10 of FIGS. 1-3 also provides a maximum depth indicator needle 18 which is provided with a push member 20 in engagement with needle 16. When needle 16 is rotated clockwise, as seen in FIGS. 1 and 2, its engagement with the push member 20 of needle 18 also rotates the needle 18 clockwise. However, upon reduction in pressure due to the diver ascending to higher depths or to the surface, maximum depth indicator needle 18 remains at the highest position reached by needle 16. As a result, needle 18 always provides the diver with an indication of the maximum depth to which he has descended during the dive. Maximum depth indicator needle 18 is mechanically coupled to a manual control knob 22, which permits the diver to reset needle 18 after he has completed the dive so that it can respond to the maximum position of needle 16 in a subsequent dive. A stop 21 is provided at the zero depth calibration point on the face 26 against which needle 16 rests when the gauge is not submerged.

Those portions of the depth gauge 10 of FIGS. 1-3 described in the above paragraphs comprise the prior art device of which the present invention is an improvement. That improvement resides in the provision of a unique fluid dam 24 molded into or otherwise affixed to the transparent enclosure 14 extending to the dial face 26 between the dial face and the interior surface of transparent enclosure 14 and extending radially from about the outer periphery of manual control knob 22 to the interior radial periphery of a transparent enclosure 14. The primary function of dam 24 is to resist the flow of the oil or other low friction, low viscosity fluid contained within the depth gauge 10, around the face 26. Such flow may inadvertently occur as a result of sudden movement of the depth gauge during the dive such as a result of jarring or other violent shock to the gauge. Without the fluid dam 24, such fluid flow can readily alter the position of maximum depth indicator needle 18 which would, of course, render the position of needle 18 relative to the graduations 17 entirely inaccurate and thus hazardous or inconvenient as previously noted.

Thus, the fluid dam 24, which constitutes the improvement of the present invention, provides the highly advantageous feature of preventing or at least substantially reducing the interaction between inadvertent flow of the oil within the gauge and the maximum depth indicator needle 18. The position of the fluid dam 14 along the face 26 is preferably chosen to be intersecting the shorter distance between the highest graduation 17 of the depth gauge 10 and the stop 21 so that it does not interfere with the movement of needles 16 and 18 throughout the calibrated range of the depth gauge. The material from which fluid dam 24 is made, may be virtually any material which can be readily affixed to the enclosure 14 and which does not become chemically unstable in the fluid environment of the oil-filled depth gauge. However, it may be enclosure 14 is made in order to enhance the aesthetic appearance of the gauge and also to permit fabrication of the enclosure and dam as a unitary molded member.

It will now be understood that What has been disclosed herein comprises an improved oil-filled scuba diving depth gauge of the type having a mechanically pushed maximum depth indicator needle which is susceptible to inaccuracies caused by the relative flow of the oil along the face of the gauge. Such relative flow may, for example, result from a violent movement of the gauge from jarring or other violent shock. The improvement comprises a fluid dam which is positioned between the surface of the gauge face, the transparent enclosure of the gauge and projects in a radial direction to interfere and substantially limit the flow of such oil despite the occurrence of such a jarring event. In this manner, the fluid dam of the present invention prevents inadvertent movement of the maximum depth indicator needle from relative motion of the oil along the gauge face surface which could otherwise create a hazard for the diver who may inadvertently be led to believe that his maximum depth was not as great as it actually was and thus underestimate the time he needs to safely ascend to the surface. Accordingly, despite the apparent simplicity of the present invention, the improvement constitutes a significant safety advantage which tends to enhance the accuracy of the gauge's maximum depth reading.

Those having skill in the art to which the present invention pertains, will now as a result of the applicant's teaching herein, perceive various modifications and additions which may be made to the invention. By way of example, while a specific shape and position of the fluid dam of the present invention and positions may also be employed. Thus, while the fluid dam shown herein is of a substantially straight configuration, it will be understood that an arched or curved dam would also provide the advantageous features of the invention. Furthermore, while the dam shown herein is affixed to the interior surface of the transparent enclosure of the depth gauge, it may also be affixed to other portions of the gauge for resisting the relative flow of oil along the face surface. Accordingly, all such modifications and additions are deemed to be within the scope of the invention which is to be limited only by the claims appended hereto.

I claim:

1. A fluid-filled depth gauge for divers, the gauge comprising:
    a dial face;
    a transparent cover enclosing said dial ace;
    means disposed between said dial face and said cover for indicating a depth parameter;
    a fluid barrier disposed between said dial face and said cover for blocking fluid flow therein;
    said fluid barrier being affixed between said dial face and said cover;
    said cover and said dial being of a substantially coaxial and equally sized circular configuration and said barrier extending radially from about their common axis to their periphery; and
    said barrier being substantially perpendicular to said dial face.

* * * * *